US010233358B2

(12) United States Patent
Ando

(10) Patent No.: US 10,233,358 B2
(45) Date of Patent: *Mar. 19, 2019

(54) POLISHING COMPOSITION FOR MAGNETIC DISC SUBSTRATE

(71) Applicant: YAMAGUCHI SEIKEN KOGYO CO., LTD., Aichi (JP)

(72) Inventor: Junichiro Ando, Aichi (JP)

(73) Assignee: YAMAGUCHI SEIKEN KOGYO CO., LTD. (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/684,543

(22) Filed: Aug. 23, 2017

(65) Prior Publication Data

US 2018/0057712 A1 Mar. 1, 2018

(30) Foreign Application Priority Data

Aug. 23, 2016 (JP) ................................ 2016-162730

(51) Int. Cl.
G09G 1/02 (2006.01)
G09G 1/16 (2006.01)
C09G 1/16 (2006.01)
C09G 1/02 (2006.01)
G11B 5/84 (2006.01)

(52) U.S. Cl.
CPC ................. C09G 1/16 (2013.01); C09G 1/02 (2013.01); G11B 5/84 (2013.01); G11B 5/8404 (2013.01)

(58) Field of Classification Search
None
See application file for complete search history.

(56) References Cited

U.S. PATENT DOCUMENTS

| 6,309,434 B1* | 10/2001 | Ohashi | C09G 1/02 106/3 |
| 6,332,831 B1* | 12/2001 | Shemo | C09G 1/02 106/3 |
| 6,620,216 B2 | 9/2003 | Oshima et al. | |
| 7,531,600 B1* | 5/2009 | Rey | C02F 1/56 210/698 |
| 2003/0022987 A1* | 1/2003 | Matz | A61K 8/8158 524/814 |
| 2003/0110710 A1 | 6/2003 | Oshima et al. | |
| 2004/0010979 A1 | 1/2004 | Oshima et al. | |
| 2006/0112647 A1* | 6/2006 | Fujii | B24B 37/042 51/295 |
| 2009/0275268 A1* | 11/2009 | Ishida | B24B 37/042 451/41 |
| 2010/0155654 A1* | 6/2010 | Etoh | C09G 1/02 252/79.1 |
| 2010/0221417 A1* | 9/2010 | Miyamoto | C11D 1/62 427/129 |
| 2011/0203186 A1 | 8/2011 | Oshima et al. | |
| 2011/0245127 A1* | 10/2011 | Suzuki | C11D 1/008 510/163 |
| 2014/0335763 A1 | 11/2014 | Oshima et al. | |

FOREIGN PATENT DOCUMENTS

| JP | 2009120850 A | 6/2009 |
| JP | 2009172709 A | 8/2009 |
| JP | 2010170650 A | 8/2010 |

* cited by examiner

Primary Examiner — Shamim Ahmed
(74) Attorney, Agent, or Firm — Bracewell LLP; Brad Y. Chin

(57) ABSTRACT

Embodiments relate to a polishing composition for a magnetic disk substrate, where the polishing composition contains colloidal silica, a water-soluble polymer compound, and water. According to at least one embodiment, the water-soluble polymer compound has a weight average molecular weight of 20,000 to 10,000,000 and a concentration of 0.0001 to 2.0% by mass.

11 Claims, No Drawings

POLISHING COMPOSITION FOR MAGNETIC DISC SUBSTRATE

CROSS REFERENCE TO RELATED APPLICATIONS

This application claims the benefit of and priority to Japanese Patent Application No. JP-2016-162730, filed on Aug. 23, 2016, with Japanese Patent Office, the entire contents of which are incorporated herein by reference.

BACKGROUND

Field

Embodiments relate to a polishing composition used for polishing an electronic component such as a magnetic recording medium including a hard disk. Particularly, embodiments relate to a polishing composition for a magnetic disk substrate used for polishing a surface of a substrate for a magnetic recording medium such as a glass magnetic disk substrate or an aluminum magnetic disk substrate. Furthermore, embodiments relate to a polishing composition for a magnetic disk substrate preferably used for finish polishing of an aluminum magnetic disk substrate for a magnetic recording medium, having an electroless nickel-phosphorus plated film formed on a surface of an aluminum alloy substrate.

Description of the Related Art

Conventionally, as a polishing composition for polishing a surface of an electroless nickel-phosphorus plated film of an aluminum magnetic disk substrate, improvement of various polishing characteristics has been desired in order to improve a magnetic recording density. For example, as for a scratch, a scratch portion may cause an error in writing or reading, or burr generated around a scratch may cause collision of a head or the like.

Therefore, colloidal silica has come to be used for finish polishing of an aluminum magnetic disk substrate as an abrasive grain component playing a role of mechanical polishing of a polishing composition from a viewpoint of reduction in scratches. At this time, in industrial polishing, an abrasive grain component playing a role of mechanical polishing of a polishing composition and a chemical component playing a role of chemical polishing are mixed immediately before actual polishing to be used in many cases.

However, when colloidal silica as an abrasive grain component and a chemical component are mixed, the colloidal silica tends to be aggregated. As a countermeasure therefor, a trial to reduce scratches has been performed by removing a coarse particle or an aggregated particle, adjusting the shape of a particle, or adjusting corrosiveness of a polishing agent. For example, adjustment of corrosiveness of a polishing agent (see, for example, JP-A-2009-120850), adjustment of the shape of a particle (see, for example, JP-A-2009-172709), and adjustment of the content of an aggregated particle (see, for example, JP-A-2010-170650) have been proposed.

SUMMARY

However, the level of a scratch to be improved has become smaller and shallower, and the above countermeasure is insufficient therefor.

According to at least one embodiment, an object is to provide a polishing composition for a magnetic disk substrate for reducing scratches in a polished substrate. In addition, a polishing rate is lowered due to contamination of a polishing pad or the like after polishing many times. Therefore, an object of at least one embodiment is also to solve a problem of reduction in productivity.

In order to solve the above problem, intensive studies were made. As a result, by using the following polishing composition for a magnetic disk substrate, reduction in scratches and suppression of lowering of a polishing rate after polishing many times have been realized, and the present invention has been achieved.

According to at least one embodiment, there is provided a polishing composition for a magnetic disk substrate including colloidal silica, a water-soluble polymer compound, and water, in which the water-soluble polymer compound has a weight average molecular weight of 20,000 to 10,000,000 and a concentration of 0.0001 to 2.0% by mass.

According to at least one embodiment, the colloidal silica has an average particle size (D50) of 1 to 100 nm and a concentration of 1 to 50% by mass in the composition.

According to at least one embodiment, the water-soluble polymer compound is a copolymer containing two kinds of structural units of a structural unit derived from an unsaturated aliphatic carboxylic acid and a structural unit derived from an unsaturated amide, the molar ratio between the two kinds of structural units being from 95:5 to 5:95.

According to at least one embodiment, the unsaturated amide is N-alkylacrylamide or N-alkylmethacrylamide.

According to at least one embodiment, the copolymer is selected from the group consisting of a copolymer of acrylic acid and/or a salt thereof and N-alkylacrylamide, a copolymer of acrylic acid and/or a salt thereof and N-alkylmethacrylamide, a copolymer of methacrylic acid and/or a salt thereof and N-alkylacrylamide, and a copolymer of methacrylic acid and/or a salt thereof and N-alkylmethacrylamide.

According to at least one embodiment, the water-soluble polymer compound has a weight average molecular weight of 50,000 to 5,000,000.

According to at least one embodiment, the water-soluble polymer compound has a weight average molecular weight of 100,000 to 1,000,000.

According to at least one embodiment, the pH value (25° C.) of the polishing composition is from 0.1 to 4.0.

According to at least one embodiment, the polishing composition further includes at least one selected from the group consisting of an organic phosphonic acid and/or a salt thereof.

According to at least one embodiment, the organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminettra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

According to at least one embodiment, the polishing composition further includes a surfactant having a repeating unit and a sulfonic acid (salt) group in a molecule thereof and having an aromatic group in a main chain of the repeating unit.

According to at least one embodiment, the surfactant contains at least one selected from the group consisting of a naphthalenesulfonic acid compound, a ligninsulfonic acid compound, an aromatic aminosulfonic acid compound, and salts thereof.

According to at least one embodiment, the naphthalenesulfonic acid compound is at least one selected from the group consisting of a naphthalenesulfonic acid formaldehyde condensate, a methyl naphthalenesulfonic acid formaldehyde condensate, and salts thereof.

According to various embodiments described below, the polishing composition for the magnetic disk substrate can improve a polishing efficiency, and can reduce scratches after polishing. Furthermore, the polishing composition also has an effect to cause a polishing rate to be not easily lowered after polishing many times.

DETAILED DESCRIPTION

Hereinafter, various embodiments will be described. The present invention is not limited to the following embodiments, but change, modification, and improvement can be added thereto as long as not departing from the scope of the invention.

1. Polishing Composition.

A polishing composition for a magnetic disk substrate according to at least one embodiment contains colloidal silica, a water-soluble polymer compound, and water.

(1) Water-Soluble Polymer

A water-soluble polymer compound according to at least one embodiment is a copolymer having a weight average molecular weight of 20,000 to 10,000,000, and preferably containing a structural unit derived from an unsaturated aliphatic carboxylic acid and a structural unit derived from an unsaturated amide. Here, the water-soluble polymer compound is preferably a polymer obtained by copolymerizing an unsaturated aliphatic carboxylic acid and/or a salt thereof and an unsaturated amide as essential monomers.

(1-1) Unsaturated Aliphatic Carboxylic Acid

Examples of the unsaturated aliphatic carboxylic acid and a salt thereof include acrylic acid, methacrylic acid, maleic acid, itaconic acid, and salts thereof.

At least a part of structural units derived from an unsaturated aliphatic carboxylic acid may be included in the water-soluble polymer compound as a carboxylate. Examples of the carboxylate include sodium carboxylate, potassium carboxylate, magnesium carboxylate, ammonium carboxylate, amine carboxylate, and alkylammonium carboxylate.

In order to cause a structural unit derived from an unsaturated aliphatic carboxylic acid to be included in the water-soluble polymer compound as carboxylic acid, an unsaturated aliphatic carboxylic acid may be polymerized as a monomer, or an unsaturated aliphatic carboxylate may be polymerized as a monomer and then the resulting polymer may be converted into carboxylic acid by cation exchange. In addition, in order to cause a structural unit derived from an unsaturated aliphatic carboxylic acid to be included in the water-soluble polymer compound as a carboxylate, an unsaturated aliphatic carboxylate may be polymerized as a monomer, or an unsaturated aliphatic carboxylic acid may be polymerized as a monomer and then the resulting polymer may be neutralized with a base to form a carboxylate.

In order to evaluate a ratio between a structural unit included as a carboxylic acid and a structural unit included as a carboxylate in a water-soluble polymer compound, a pH value of the water-soluble polymer compound can be used. When the pH value of the water-soluble polymer compound is low, the ratio of the structural unit included as a carboxylic acid can be evaluated to be high. On the other hand, when the pH value of the water-soluble polymer compound is high, the ratio of the structural unit included as a carboxylate can be evaluated to be high. In the present invention, for example, a water-soluble polymer compound having a pH value (25° C.) of 1 to 13 in a water-soluble polymer compound aqueous solution having a concentration of 10% by mass can be used.

(1-2) Unsaturated Amide

As an unsaturated amide, $\alpha,\beta$-ethylenic unsaturated amide is preferably used. More specific examples thereof include an $\alpha,\beta$-ethylenic unsaturated carboxylic acid amide such as acrylamide, methacrylamide, N-alkylacrylamide, or N-alkylmethacrylamide.

More preferable examples thereof include N-alkylacrylamide and N-alkylmethacrylamide. Preferable specific examples of N-alkylacrylamide, N-alkylmethacrylamide, and the like include N-methylacrylamide, N-ethylacrylamide, N-n-propylacrylamide, N-iso-propylacrylamide, N-n-butylacrylamide, N-iso-butylacrylamide, N-sec-butylacrylamide, N-tert-butylacrylamide, N-methylmethacrylamide, N-ethylmethacrylamide, N-n-propylmethacrylamide, N-iso-propylmethacrylamide, N-n-butylmethacrylamide, N-iso-butylmethacrylamide, N-sec-butylmethacrylamide, and N-tert-butylmethacrylamide. Among these compounds, N-n-butylacrylamide, N-iso-butylacrylamide, N-sec-butylacrylamide, N-tert-butylacrylamide, N-n-butylmethacrylamide, N-iso-butylmethacrylamide, N-sec-butylmethacrylamide, and N-tort-butylmethacrylamide, and the like are preferable.

(1-3) Copolymer

The water-soluble polymer compound according to at least one embodiment is preferably a copolymer obtained by combining and polymerizing these monomer components. Preferable examples of a combination of copolymerization include a combination of acrylic acid and/or a salt thereof and N-alkylacrylamide, a combination of acrylic acid and/or a salt thereof and N-alkylmethacrylamide, a combination of methacrylic acid and/or a salt thereof and N-alkylacrylamide, and a combination of methacrylic acid and/or a salt thereof and N-alkylmethacrylamide. Among these combinations, a combination in which an alkyl group in N-alkylacrylamide or N-alkylmethacrylamide is at least one selected from the group consisting of a n-butyl group, an iso-butyl group, a sec-butyl group, and a tert-butyl group is particularly preferably used.

A molar ratio between the two kinds of structural units of a structural unit derived from an unsaturated aliphatic carboxylic acid and a structural unit derived from an unsaturated amide in the water-soluble polymer compound is preferably from 95:5 to 5:95, and more preferably from 90:10 to 10:90. When the molar ratio falls outside the range of 95:5 to 5:95, it is considered that a balance among monomer components is lost and solubility of the water-soluble polymer compound in water is influenced.

(1-4) Method for Manufacturing Water-Soluble Polymer Compound

A method for manufacturing a water-soluble polymer compound is not particularly limited, but an aqueous solution polymerization method is preferable. According to the aqueous solution polymerization, a water-soluble polymer compound as a uniform solution can be obtained.

A polymerization liquid medium in the aqueous solution polymerization is preferably an aqueous liquid medium, and is particularly preferably water. In order to improve solubility of the above monomer components in a liquid medium, an organic liquid medium may be added appropriately in a range not having a bad influence on polymerization of the monomers. Examples of the above organic liquid medium include an alcohol such as isopropyl alcohol and a ketone such as acetone. These liquid media can be used singly or in combination of two or more kinds thereof.

Hereinafter, a method for manufacturing a water-soluble polymer compound using the above aqueous liquid medium will be described. In a polymerization reaction, a known polymerization initiator can be used, but a radical polymerization initiator is particularly preferably used.

Examples of the radical polymerization initiator include a persulfate such as sodium persulfate, potassium persulfate, or ammonium persulfate, a hydroperoxide such as t-butyl hydroperoxide, a water-soluble peroxide such as hydrogen peroxide, a ketone peroxide such as methylethyl ketone peroxide or cyclohexanone peroxide, an oil-soluble peroxide such as a dialkyl peroxide including di-t-butyl peroxide and t-butyl cumyl peroxide, and an azo compound such as azobisisobutyronitrile or 2,2-azobis(2-methylpropionamidine) dihydrochloride. These peroxide-based radical polymerization initiators may be used singly or in combination of two or more kinds thereof.

Among the above peroxide-based radical polymerization initiators, a persulfate or an azo compound is preferable, and azobisisobutyronitrile is particularly preferable because of easy control of a molecular weight of a generated water-soluble polymer compound.

The use amount of the above radical polymerization initiator is not particularly limited, but is preferably from 0.1 to 15% by mass, and particularly preferably from 0.5 to 10% by mass based on the total mass of all the monomers of a water-soluble polymer compound. By setting this ratio to 0.1% by mass or more, a copolymerization ratio can be improved. By setting this ratio to 15% by mass or less, stability of a water-soluble polymer compound can be improved.

In some cases, a water-soluble polymer compound may be manufactured using a water-soluble redox-based polymerization initiator. Examples of the redox-based polymerization initiator include a combination of an oxidizer (for example, the above peroxide) and a reducing agent such as sodium bisulfate, ammonium bisulfite, ammonium sulfite, or sodium hydrosulfite, iron alum, potassium alum, or the like.

In manufacturing a water-soluble polymer compound, a chain transfer agent may be added appropriately to a polymerization system in order to adjust a molecular weight. Examples of the chain transfer agent include sodium phosphite, sodium hypophosphite, potassium hypophosphite, sodium sulfite, sodium hydrogen sulfite, mercaptoacetic acid, mercaptopropionic acid, thioglycolic acid, 2-propanethiol, 2-mercaptoethanol, and thiophenol.

A polymerization temperature for manufacturing a water-soluble polymer compound is not particularly limited, but is preferably from 60 to 100° C. By setting the polymerization temperature to 60° C. or higher, a polymerization reaction proceeds smoothly to obtain excellent productivity. By setting the polymerization temperature to 100° C. or lower, coloring can be suppressed.

In addition, the polymerization reaction can be performed under an increased or reduced pressure, but is preferably performed at a normal pressure because of cost of equipment for a reaction under an increased or reduced pressure. Polymerization time is preferably from 2 to 20 hours, and is particularly preferably about from 3 to 10 hours.

After the polymerization reaction, neutralization is performed with a basic compound, as necessary. Examples of the basic compound used for neutralization include an alkali metal hydroxide such as sodium hydroxide or potassium hydroxide, an alkaline earth metal hydroxide such as calcium hydroxide or magnesium hydroxide, ammonia water, and an organic amine such as monoethanol amine, diethanol amine, or triethanol amine. Among these compounds, ammonia water is preferable in view of dispersibility of a water-soluble polymer compound generated and avoiding contamination of a substrate to be polished. The pH value (25° C.) after neutralization is preferably from 1 to 13 in a case of an aqueous solution having a water-soluble polymer compound concentration of 10% by mass.

(1-5) Weight Average Molecular Weight

The weight average molecular weight of the water-soluble polymer compound is from 20,000 to 10,000,000, and preferably from 50,000 to 5,000,000. The weight average molecular weight is more preferably from 100,000 to 1,000,000. Note that the weight average molecular weight of the water-soluble polymer compound is measured in terms of polyacrylic acid by gel permeation chromatography (GPC). When the weight average molecular weight of the water-soluble polymer compound is less than 20,000, scratches are deteriorated. On the other hand, when the weight average molecular weight exceeds 10,000,000, the viscosity of the aqueous solution becomes high and handling becomes difficult.

(1-6) Concentration

The concentration of the water-soluble polymer compound in the polishing composition is preferably 0.0001% by mass or more and 2.0% by mass or less, more preferably 0.001% by mass or more and 1.0% by mass or less, and still more preferably 0.005% by mass or more and 0.5% by mass or less in terms of a solid content. When the concentration of the water-soluble polymer compound is less than 0.0001% by mass, an effect of adding the water-soluble polymer compound cannot be obtained sufficiently. When the concentration is more than 2.0% by mass, the effect of adding the water-soluble polymer compound reaches the ceiling, and it is not economical to add the water-soluble polymer compound excessively.

(2) Colloidal Silica

Colloidal silica used in the present invention preferably has an average particle size (D50) of 1 to 100 nm. The average particle size is more preferably from 2 to 80 nm. Colloidal silica is obtained by a water glass process for growing a particle by a condensation reaction of an alkali metal silicate such as sodium silicate or potassium silicate as a raw material in an aqueous solution. Alternatively, colloidal silica is obtained by an alkoxysilane method for growing a particle by an acid or alkali hydrolysis condensation reaction of an alkoxysilane such as tetraethoxy silane as a raw material in water containing a water-soluble organic liquid medium such as an alcohol.

As the shape of colloidal silica, a spherical shape, a chain shape, a kompeito-typed shape (like particles having convexes on the surface), a heteromorphic shape, or the like is known, and primary particles are monodispersed in water to form a colloid shape. As the colloidal silica used in the present invention, spherical or approximately spherical colloidal silica is particularly preferable. Scratches can be reduced by using spherical or approximately spherical colloidal silica.

The concentration of colloidal silica in the polishing composition is preferably from 1 to 50% by mass. The concentration is more preferably from 2 to 40% by mass.

(3) Acid and/or Salt Thereof

According to at least one embodiment, an acid and/or a salt thereof can be used for pH adjustment or as an optional component. Examples of the acid and/or a salt thereof to be used include an inorganic acid and/or a salt thereof and an organic acid and/or a salt thereof.

Examples of the inorganic acid and/or a salt thereof include an inorganic acid such as nitric acid, sulfuric acid, hydrochloric acid, phosphoric acid, phosphonic acid, pyrophosphoric acid, or tripolyphosphoric acid, and/or salts thereof.

Examples of the organic acid and/or a salt thereof include an aminocarboxylic acid such as glutamic acid or aspartic acid, and/or salts thereof, a carboxylic acid such as citric acid, tartaric acid, oxalic acid, nitroacetic acid, maleic acid, malic acid, or succinic acid, and/or salts thereof, and an organic phosphonic acid and/or a salt thereof. These acids and/or salts thereof can be used singly or in combination of two or more kinds thereof.

The organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1l-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

Use of a combination of two or more kinds of the above compounds is also a preferable aspect. Specific examples thereof include a combination of phosphoric acid and an organic phosphonic acid and a combination of phosphoric acid and an organic phosphonate.

(4) Oxidizer

According to at least one embodiment, an oxidizer can be used as a polishing accelerator. Examples of the oxidizer used include a peroxide, permanganic acid or a salt thereof, chromic acid or a salt thereof, peroxoacid or a salt thereof, halogen oxoacid or a salt thereof, oxoacid or a salt thereof, and a mixture of two or more kinds of these oxidizers.

Specific examples thereof include hydrogen peroxide, sodium peroxide, barium peroxide, potassium permanganate, a metal salt of chromic acid, a metal salt of dichromic acid, persulfuric acid, sodium persulfate, potassium persulfate, ammonium persulfate, peroxophosphonic acid, sodium peroxoborate, performic acid, peracetic acid, hypochlorous acid, sodium hypochlorite, and calcium hypochlorite. Among these compounds, hydrogen peroxide, persulfuric acid and a salt thereof, hypochlorous acid and a salt thereof, and the like are preferable, and hydrogen peroxide is more preferable.

The content of an oxidizer in the polishing composition is preferably from 0.01 to 10.0% by mass. The content is more preferably from 0.1 to 5.0% by mass.

(5) Other Components

According to at least one embodiment, the polishing composition can further contain a surfactant having a repeating unit and a sulfonic acid (salt) group in a molecule thereof and having an aromatic group in a main chain of the repeating unit.

Specific examples of the surfactant include a naphthalenesulfonic acid compound such as a naphthalenesulfonic acid formaldehyde condensate or a methylnaphthalenesulfonic acid formaldehyde condensate, a melamine formalin resin sulfonic acid compound such as a melamine sulfonic acid formaldehyde condensate, a ligninsulfonic acid compound such as ligninsulfonic acid or modified ligninsulfonic acid, an aromatic aminosulfonic acid compound such as an aminoarylsulfonic acid-phenol-formaldehyde condensate, and salts thereof. Among these compounds, a naphthalenesulfonic acid compound, a ligninsulfonic acid compound, an aromatic aminosulfonic acid compound, and salts thereof are preferable.

Examples of a counter ion for a salt thereof include an alkali metal salt of sodium, potassium, or the like, an alkaline earth metal salt of calcium or the like, an ammonium salt, a primary amine salt such as monoethanol amine, a secondary amine salt such as diethanol amine, a tertiary amine salt such as triethanol amine, and a quaternary ammonium salt such as tetramethyl ammonium.

Examples of the naphthalenesulfonic acid compound, the ligninsulfonic acid compound, the aromatic aminosulfonic acid compound, and salts thereof include an acid and a salt such as an alkali metal salt of sodium, potassium, or the like, an alkaline earth metal salt of calcium or the like, an ammonium salt, a primary amine salt including monoethanol amine, a secondary amine salt including diethanol amine, a tertiary amine salt including triethanol amine, or a quaternary ammonium salt including tetramethyl ammonium, as described above. Among these compounds, a salt of a naphthalenesulfonic acid compound is preferable, and a sodium naphthalenesulfonate formaldehyde condensate, a sodium methylnaphthalenesulfonate formaldehyde condensate, and the like are preferably used.

The content of the surfactant in the polishing composition is preferably 0.0001% by mass or more and 2.0% by mass or less, and more preferably 0.001% by mass or more and 1.0% by mass or less.

2. Physical Properties

The pH value (25° C.) of the polishing composition according to an aspect of the present invention is preferably from 0.1 to 4.0. The pH value (25° C.) is more preferably from 0.5 to 3.0. The pH value (25° C.) of the polishing composition of 0.1 or more can suppress deterioration of surface smoothness. The pH value (25° C.) of the polishing composition of 4.0 or less can suppress lowering of a polishing rate.

The polishing composition according to at least one embodiment can be used for polishing various electronic components such as a magnetic recording medium including a hard disk. Particularly, the polishing composition according to at least one embodiment can be used preferably for polishing an aluminum magnetic disk substrate. The polishing composition according to at least one embodiment can be more preferably used for polishing an electroless nickel-phosphorus plated aluminum magnetic disk substrate. Electroless nickel-phosphorus plating is usually performed at a pH value (25° C.) of 4.0 to 6.0. Nickel tends to be dissolved at a pH value (25° C.) of less than 4.0, and therefore plating does not proceed easily. Meanwhile, in polishing, for example, nickel tends to be dissolved at a pH value (25° C.) of less than 4.0, and therefore use of the polishing composition according to an aspect of the present invention can increase a polishing rate.

3. Method for Polishing Magnetic Disk Substrate

The polishing composition according to at least one embodiment is suitable for use in polishing a magnetic disk substrate such as an aluminum magnetic disk substrate or a glass magnetic disk substrate. Particularly, the polishing composition according to at least one embodiment is suitable for use in finish polishing of an electroless nickel-phosphorus plated aluminum magnetic disk substrate.

Examples of a polishing method to which the polishing composition according to at least one embodiment can be applied include a method for pasting a polishing pad on a surface plate of a polishing machine, feeding a polishing composition to a surface to be polished in the polishing target or the polishing pad, and rubbing the surface to be polished with the polishing pad. For example, when front and back surfaces of an aluminum magnetic disk substrate are polished simultaneously, a double-side polishing machine in which polishing pads are pasted on an upper surface plate and a lower surface plate can be used. In this method, an aluminum magnetic disk substrate is sandwiched by polishing pads pasted on an upper surface plate and a lower surface plate, a polishing composition is supplied between a polishing surface and each of the polishing pads, the two polishing pads are rotated simultaneously, and front and back surfaces of the aluminum magnetic disk substrate are thereby polished. A urethane type, suede type, nonwoven fabric type, or any other types of polishing pad can be used.

(Examples)

Hereinafter, embodiments will be described in more detail based on Examples, but the present invention is not limited to the Examples.

In polishing in the following Examples and Comparative Examples, 100 electroless nickel-phosphorus plated aluminum alloy substrates which had been rough polished in advance were prepared, and were polished continuously from the first substrate to the hundredth substrate. Table 2 indicates evaluation results for a polishing rate and a scratch after the tenth substrate in the middle of this continuous finish polishing, the fiftieth substrate in the middle thereof, and the hundredth substrate as the last substrate were subjected to finish polishing. Transition of the polishing rate and the scratch in a finish polishing step was compared among Examples and Comparative Examples. Hereinafter, specific description will be given.

(Method for Preparing Polishing Composition)

Polishing compositions used in Examples 1 to 16 and Comparative Examples 1 to 4 contain materials indicated in Table 1 in the contents or addition amounts indicated in Table 1.

TABLE 1

| Material | Content | Use |
| --- | --- | --- |
| Colloidal silica I (average particle size (D50): 21 nm) | 5.6% by mass | Examples 1, 3, 5, 7, 9, 11, 13, and 15 Comparative Examples 1, 3 |
| Colloidal silica II (average particle size (D50): 29 nm) | 5.6% by mass | Examples 2, 4, 6, 8, 10, 12, and 16 Comparative Examples 2 and 4 |
| Sulfuric acid | 0.8% by mass | Examples 1 to 16 Comparative Examples 1 to 4 |
| 1-Hydroxyethylidene-1,1-diphosphonic acid (HEDP, organic phosphonic acid) | 0.2% by mass | Examples 11 to 14 |
| Hydrogen peroxide | 0.6% by mass | Examples 1 to 16 Comparative Examples 1 to 4 |
| Acrylic polymer I (copolymer of acrylic acid/N-tert-butylacrylamide = 86/14 (molar ratio), weight average molecular weight = 60,000) | 0.04% by mass | Examples 1, 2, and 11 to 14 |
| Acrylic Polymer II (copolymer of acrylic acid/N-tert-butylacrylamide = 86/14 (molar ratio), weight average molecular weight = 120,000) | 0.01% by mass | Examples 5 and 6 |
| Acrylic Polymer II (copolymer of acrylic acid/N-tert-butylacrylamide = 86/14 (molar ratio), weight average molecular weight = 120,000) | 0.04% by mass | Examples 3 and 4 |
| Acrylic Polymer II (copolymer of acrylic acid/N-tert-butylacrylamide = 86/14 (molar ratio), weight average molecular weight = 120,000) | 0.1% by mass | Examples 7 and 8 |
| Acrylic Polymer III (copolymer of acrylic acid/N-tert-butylacrylamide = 86/14 (molar ratio), weight average molecular weight = 340,000) | 0.04% by mass | Examples 9 and 10 |
| Acrylic polymer IV (sodium polyacrylate, weight average molecular weight = 300,000) | 0.04% by mass | Example 15 and 16 |
| Acrylic polymer V (sodium polyacrylate, weight average molecular weight = 6,000) | 0.04% by mass | Comparative Examples 3 and 4 |
| Sodium naphthalenesulfonate formaldehyde condensate (manufactured by DKS Co., Ltd., LAVELIN FM-45, surfactant) | 0.02% by mass | Examples 13 and 14 |

Colloidal silica I is a commercially available product having an average particle size (D50) of 21 nm. Colloidal silica II is a commercially available product having an average particle size (D50) of 29 nm.

Sulfuric acid was contained in an amount of 0.8% by mass such that the pH value (25° C.) of the polishing composition was 1.2.

1-hydroxyethylidene-1,1-diphosphonic acid is an organic phosphonic acid, and is abbreviated as HEDP below. Hydrogen peroxide was used as an oxidizer.

Acrylic polymer I was a copolymer of acrylic acid/N-tert-butylacrylamide=86/14 (molar ratio), and had a weight average molecular weight of 60,000. The pH value (25° C.) of a 10% by mass acrylic polymer I aqueous solution is usually 2.2. Acrylic polymer II was a copolymer of acrylic acid/N-tert-butylacrylamide=86/14 (molar ratio), and had a weight average molecular weight of 120,000. The pH value (25° C.) of a 10% by mass acrylic polymer II aqueous solution is usually 2.2. Acrylic polymer III was a copolymer of acrylic acid/N-tert-butylacrylamide=86/14 (molar ratio), and had a weight average molecular weight of 340,000. The pH value (25° C.) of a 10% by mass acrylic polymer III aqueous solution is usually 2.2. Acrylic polymer IV was a sodium polyacrylate, and had a weight average molecular weight of 300,000. The pH value (25° C.) of a 10% by mass acrylic polymer IV aqueous solution is usually 7.0. Acrylic polymer V was a sodium polyacrylate, and had a weight average molecular weight of 6,000. The pH value (25° C.) of a 10% by mass acrylic polymer V aqueous solution is usually 7.0.

Acrylic polymers I, II, and III are copolymers having weight average molecular weights of 60,000, 120,000, and 340,000, respectively, and containing a structural unit derived from an unsaturated aliphatic carboxylic acid and a structural unit derived from an unsaturated amide. Acrylic polymers IV and V are homopolymers of an acrylic acid (salt) having weight average molecular weights of 300,000 and 6,000, respectively.

The weight average molecular weight of the water-soluble polymer compound is measured in terms of polyacrylic acid by gel permeation chromatography (GPC), and GPC measurement conditions are shown below.

(GPC Condition)
Column: G4000PWXL (manufactured by Tosoh Corporation)+G2500PWXL (manufactured by Tosoh Corporation)
Eluent: 0.2 M phosphoric acid buffer/acetonitrile=9/1 (volume ratio)
Flow rate: 1.0 ml/min
Temperature: 40° C.
Detection: 210 nm (UV)
Sample: concentration 5 mg/ml (injection amount 100 μl)
Polymer for calibration curve: polyacrylic acid molecular weight (peak top molecular weight: Mp) 115,000, 28,000, 4100, 1250 (Sowa Science Co., Ltd., American Polymer Standards, Corp.)

A sodium naphthalenesulfonate formaldehyde condensate LAVELIN FM-45 (manufactured by DKS Co., Ltd.) was used as a surfactant.

(Particle Diameter of Colloidal Silica)

The particle diameter (Heywood diameter) of colloidal silica was measured as a Heywood diameter (diameter equivalent to a projected area circle) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average particle size of colloidal silica is an average particle size (D50) obtained by analyzing particle diameters of about 2000 particles of colloidal silica by the above method and calculating a particle diameter having 50% of an accumulated particle diameter distribution (based on accumulated volume) from a small particle diameter side using the above analysis software (manufactured by Mountech Co., Ltd., Mac-View Ver. 4.0).

(Polishing Conditions)

An electroless nickel-phosphorus plated aluminum magnetic disk substrate having an outer diameter of 95 mm was rough polished, and the resulting product was polished as a polishing target.

Polishing machine: manufactured by SpeedFam Company Limited, 9B double-side polishing machine
Polishing pad: Pad for P2 manufactured by FILWEL Co., Ltd.
Surface plate rotating speed: upper surface plate −8.3 $\text{min}^{-1}$
Lower surface plate 25.0 $\text{min}^{-1}$
Feed of polishing composition: 100 ml/min
Polishing time: 300 seconds
Processing pressure: 11 kPa Components were mixed to prepare a polishing composition. Thereafter, the polishing composition was introduced into a polishing machine through a filter having an opening of 0.45 μm, and was subjected to a polishing test.

(Evaluation of Disk Surface Polished)
(Polishing Rate Ratio)

The mass of an aluminum magnetic disk substrate, reduced after polishing was measured, and a polishing rate was calculated based on the following formula.

$$\text{Polishing rate (μm/min)} = \text{reduction in mass of aluminum magnetic disk substrate (g)/polishing time (min)/area of one surface of aluminum magnetic disk substrate } (\text{cm}^2)/\text{density of electroless nickel-phosphorus plated film } (\text{g/cm}^3)/2 \times 10^4$$

(In the above formula, area of one surface of aluminum magnetic disk substrate=65.9 $\text{cm}^2$, density of electroless nickel-phosphorus plated film=8.0 $\text{g/cm}^3$)

A polishing rate ratio is a relative value in a case where a polishing rate determined using the above formula when the tenth substrate is polished in Comparative Example 1 is assumed to be 1 (base). Note that the polishing rate when the tenth substrate was polished in Comparative Example 1 was 0.1052 μm/min.

(Scratch Ratio)

The number of scratches on a substrate was measured using MicroMAX VMX-4100 manufactured by Vision Psytech, Ltd. under a measurement condition of a tilt angle of −5° and a magnitude of 20. The scratch ratio is a relative value in a case where the number of scratches when the tenth substrate is polished in Comparative Example 1 is assumed to be 1 (base).

TABLE 2

| Experiment number | Colloidal silica Average particle size D50 (nm) | Colloidal silica Concentration (% by mass) | Acid | Organic phosphonic acid | Water-soluble polymer compound Kind | Water-soluble polymer compound Concentration (% by mass) | LAVELIN FM-45 Concentration (% by mass) | pH (25° C.) | Polishing rate ratio (with respect to Comparative Example 1: tenth substrate) Tenth | Fiftieth | Hundredth | Scratch ratio (with respect to Comparative Example 1: tenth substrate) Tenth | Fiftieth | Hundredth |
|---|---|---|---|---|---|---|---|---|---|---|---|---|---|---|
| Example 1 | 21 | 5.6 | Sulfuric acid | None | Acrylic polymer I | 0.04 | 0 | 1.2 | 1.21 | 1.20 | 1.18 | 0.53 | 0.56 | 0.52 |
| Example 2 | 29 | 5.6 | Sulfuric acid | None | Acrylic polymer I | 0.04 | 0 | 1.2 | 1.34 | 1.33 | 1.32 | 0.59 | 0.61 | 0.55 |
| Example 3 | 21 | 5.6 | Sulfuric acid | None | Acrylic Polymer II | 0.04 | 0 | 1.2 | 1.23 | 1.22 | 1.20 | 0.47 | 0.45 | 0.43 |
| Example 4 | 29 | 5.6 | Sulfuric acid | None | Acrylic Polymer II | 0.04 | 0 | 1.2 | 1.38 | 1.36 | 1.37 | 0.56 | 0.54 | 0.52 |
| Example 5 | 21 | 5.6 | Sulfuric acid | None | Acrylic Polymer II | 0.01 | 0 | 1.2 | 1.17 | 1.16 | 1.15 | 0.58 | 0.56 | 0.58 |
| Example 6 | 29 | 5.6 | Sulfuric acid | None | Acrylic Polymer II | 0.01 | 0 | 1.2 | 1.30 | 1.27 | 1.25 | 0.63 | 0.61 | 0.59 |
| Example 7 | 21 | 5.6 | Sulfuric acid | None | Acrylic Polymer II | 0.1 | 0 | 1.2 | 1.25 | 1.23 | 1.22 | 0.46 | 0.44 | 0.42 |
| Example 8 | 29 | 5.6 | Sulfuric acid | None | Acrylic Polymer II | 0.1 | 0 | 1.2 | 1.39 | 1.36 | 1.35 | 0.60 | 0.56 | 0.50 |
| Example 9 | 21 | 5.6 | Sulfuric acid | None | Acrylic Polymer III | 0.04 | 0 | 1.2 | 1.19 | 1.18 | 1.17 | 0.48 | 0.50 | 0.46 |
| Example 10 | 29 | 5.6 | Sulfuric acid | None | Acrylic Polymer III | 0.04 | 0 | 1.2 | 1.33 | 1.31 | 1.29 | 0.59 | 0.57 | 0.56 |
| Example 11 | 21 | 5.6 | Sulfuric acid | HEDP | Acrylic polymer I | 0.04 | 0 | 1.2 | 1.30 | 1.29 | 1.26 | 0.36 | 0.43 | 0.37 |
| Example 12 | 29 | 5.6 | Sulfuric acid | HEDP | Acrylic polymer I | 0.04 | 0 | 1.2 | 1.43 | 1.45 | 1.42 | 0.43 | 0.47 | 0.44 |
| Example 13 | 21 | 5.6 | Sulfuric acid | HEDP | Acrylic polymer I | 0.04 | 0.02 | 1.2 | 1.24 | 1.22 | 1.21 | 0.22 | 0.20 | 0.19 |
| Example 14 | 29 | 5.6 | Sulfuric acid | HEDP | Acrylic polymer I | 0.04 | 0.02 | 1.2 | 1.39 | 1.36 | 1.37 | 0.25 | 0.19 | 0.21 |
| Example 15 | 21 | 5.6 | Sulfuric acid | None | Acrylic polymer IV | 0.04 | 0 | 1.2 | 1.08 | 1.03 | 1.02 | 0.86 | 0.81 | 0.78 |
| Example 16 | 29 | 5.6 | Sulfuric acid | None | Acrylic polymer IV | 0.04 | 0 | 1.2 | 1.18 | 1.13 | 1.12 | 0.90 | 0.85 | 0.82 |
| Comparative Example 1 | 21 | 5.6 | Sulfuric acid | None | None | 0 | 0 | 1.2 | 1 | 0.95 | 0.91 | 1 | 1.04 | 1.02 |
| Comparative Example 2 | 29 | 5.6 | Sulfuric acid | None | None | 0 | 0 | 1.2 | 1.08 | 1.01 | 0.97 | 1.05 | 1.01 | 1.11 |
| Comparative Example 3 | 21 | 5.6 | Sulfuric acid | None | Acrylic polymer V | 0.04 | 0 | 1.2 | 1.11 | 1.06 | 1.01 | 1.10 | 1.28 | 1.30 |
| Comparative Example 4 | 29 | 5.6 | Sulfuric acid | None | Acrylic polymer V | 0.04 | 0 | 1.2 | 1.21 | 1.16 | 1.14 | 1.29 | 1.35 | 1.33 |

(Discussion)

From comparison between Comparative Examples 1 and 3 and between Comparative Examples 2 and 4, it is found that a polishing rate is increased but scratches are poorer due to addition of a homopolymer of acrylic acid (salt) (acrylic polymer V) having a weight average molecular weight of 6,000. On the other hand, from comparison between Example 15 and Comparative Example 1 and between Example 16 and Comparative Example 2, it is found that a polishing rate is increased and scratches are improved due to addition of a homopolymer of acrylic acid (salt) (acrylic polymer IV) having a weight average molecular weight of 300,000.

Furthermore, from comparison between Example 1 and Comparative Example 1 and between Example 2 and Comparative Example 2, it is found that not only an initial polishing rate is increased but also lowering of a polishing rate after polishing many times is suppressed, and scratches are also largely improved in a case of addition of a copolymer of acrylic acid (salt) and an unsaturated amide (acrylic polymer I) having a weight average molecular weight of 60,000.

Polishing compositions in Examples 3 and 4 (acrylic polymer II having a weight average molecular weight of 120,000) were obtained by increasing a weight average molecular weight of a copolymer of acrylic acid (salt) and an unsaturated amide in Examples 1 and 2. In Examples 3 and 4, a scratch improvement effect is more remarkable.

It is found that the polishing rate is further increased and scratches are further improved by further adding an organic phosphonic acid (salt) (HEDP) to Examples 1 and 2 (from comparison between Examples 11 and 1 and between Examples 12 and 2).

Polishing compositions in Examples 13 and 14 were obtained by further adding a naphthalenesulfonic acid compound (salt) (LAVELIN FM-45) to polishing compositions in Examples 11 and 12 in order to improve scratches. It is found that scratches are largely improved as compared to those before addition of the naphthalenesulfonic acid compound (salt).

From the above, it is found that scratches after polishing can be reduced, and lowering of a polishing rate after polishing many times can be suppressed by using the polishing composition according to at least one embodiment.

The polishing composition according to at least one embodiment can be used for polishing an electronic component such as a semiconductor or a magnetic recording medium including a hard disk. Particularly, the polishing composition according to at least one embodiment can be used for polishing a surface of a substrate for a magnetic recording medium such as a glass magnetic disk substrate or an aluminum magnetic disk substrate. Furthermore, the polishing composition according to at least one embodiment can be used for finish polishing of an aluminum magnetic disk substrate for a magnetic recording medium, having an electroless nickel-phosphorus plated film formed on a surface of an aluminum alloy substrate.

What is claimed is:

1. A polishing composition for a magnetic disk substrate, comprising:
    colloidal silica;
    a water-soluble polymer compound; and
    water,
    wherein the water-soluble polymer compound has a weight average molecular weight of 20,000 to 10,000,000 and a concentration of 0.0001 to 2.0% by mass,
    wherein the water-soluble polymer compound is a copolymer containing two kinds of structural units of a structural unit derived from an unsaturated aliphatic carboxylic acid and a structural unit derived from an unsaturated amide, the molar ratio between the two kinds of structural units being from 95:5 to 5:95, and
    wherein the unsaturated amide is N-alkylacrylamide or N-alkylmethacrylamide.

2. The polishing composition for the magnetic disk substrate according to claim 1, wherein the colloidal silica has an average particle size (D50) of 1 to 100 nm and a concentration of 1 to 50% by mass in the composition.

3. The polishing composition for the magnetic disk substrate according to claim 1, wherein the copolymer is selected from the group consisting of a copolymer of acrylic acid and/or a salt thereof and N-alkylacrylamide, a copolymer of acrylic acid and/or a salt thereof and N-alkylmethacrylamide, a copolymer of methacrylic acid and/or a salt thereof and N-alkylacrylamide, and a copolymer of methacrylic acid and/or a salt thereof and N-alkylmethacrylamide.

4. The polishing composition for the magnetic disk substrate according to claim 1, wherein the water-soluble polymer compound has a weight average molecular weight of 50,000 to 5,000,000.

5. The polishing composition for the magnetic disk substrate according to claim 1, wherein the water-soluble polymer compound has a weight average molecular weight of 100,000 to 1,000,000.

6. The polishing composition for the magnetic disk substrate according to claim 1, wherein the pH value at 25° C. of the polishing composition is from 0.1 to 4.0.

7. The polishing composition for the magnetic disk substrate according to claim 1, further comprising at least one selected from the group consisting of an organic phosphonic acid and/or a salt thereof.

8. The polishing composition for the magnetic disk substrate according to claim 7, wherein the organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

9. The polishing composition for the magnetic disk substrate according to claim 1, further comprising:
    a surfactant having a repeating unit and at least one of a sulfonic acid and a sulfonate group in a molecule thereof and having an aromatic group in a main chain of the repeating unit.

10. The polishing composition for the magnetic disk substrate according to claim 9, wherein the surfactant contains at least one selected from the group consisting of a naphthalenesulfonic acid compound, a ligninsulfonic acid compound, an aromatic aminosulfonic acid compound, and salts thereof.

11. The polishing composition for the magnetic disk substrate according to claim 10, wherein the naphthalenesulfonic acid compound is at least one selected from the group consisting of a naphthalenesulfonic acid formaldehyde condensate, a methyl naphthalenesulfonic acid formaldehyde condensate, and salts thereof.

* * * * *